Jan. 27, 1942.   B. STECHBART   2,271,235
LIGHT SHUTTER MECHANISM
Filed July 26, 1940   5 Sheets-Sheet 1

INVENTOR
BRUNO STECHBART
BY *Robert F. Miehle*,
ATTY.

Jan. 27, 1942.  B. STECHBART  2,271,235
LIGHT SHUTTER MECHANISM
Filed July 26, 1940  5 Sheets-Sheet 3

INVENTOR
BRUNO STECHBART
BY Robert F. Miehle, Jr.
ATTY

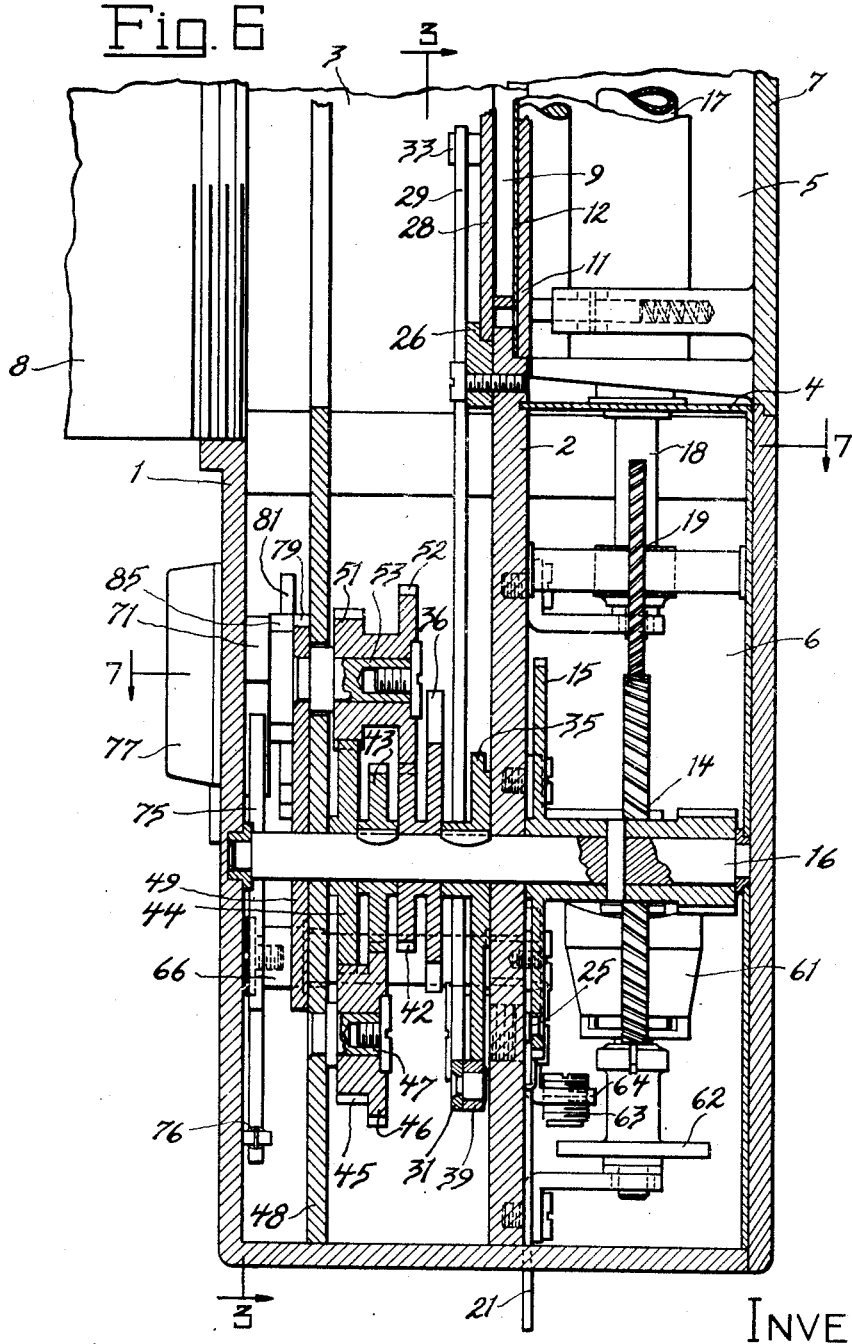

Jan. 27, 1942.　　　B. STECHBART　　　2,271,235
LIGHT SHUTTER MECHANISM
Filed July 26, 1940　　　5 Sheets-Sheet 5
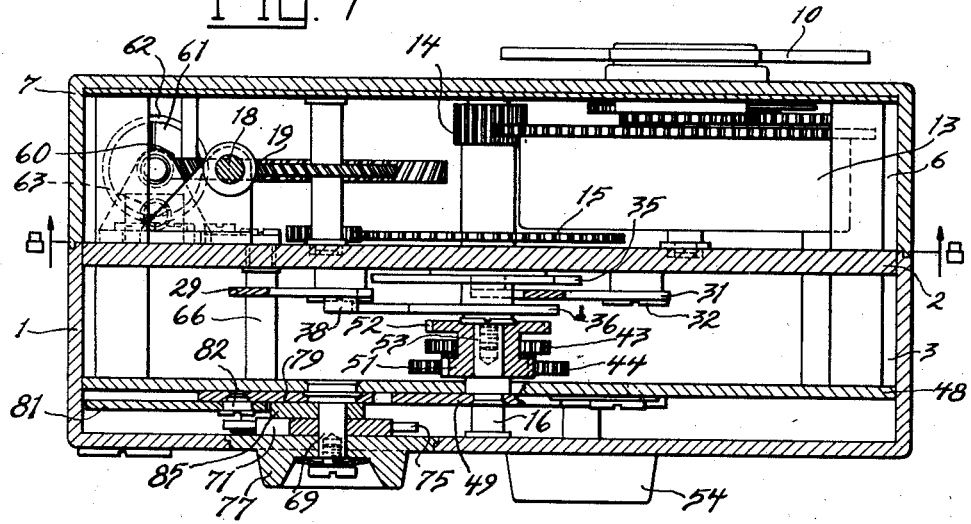
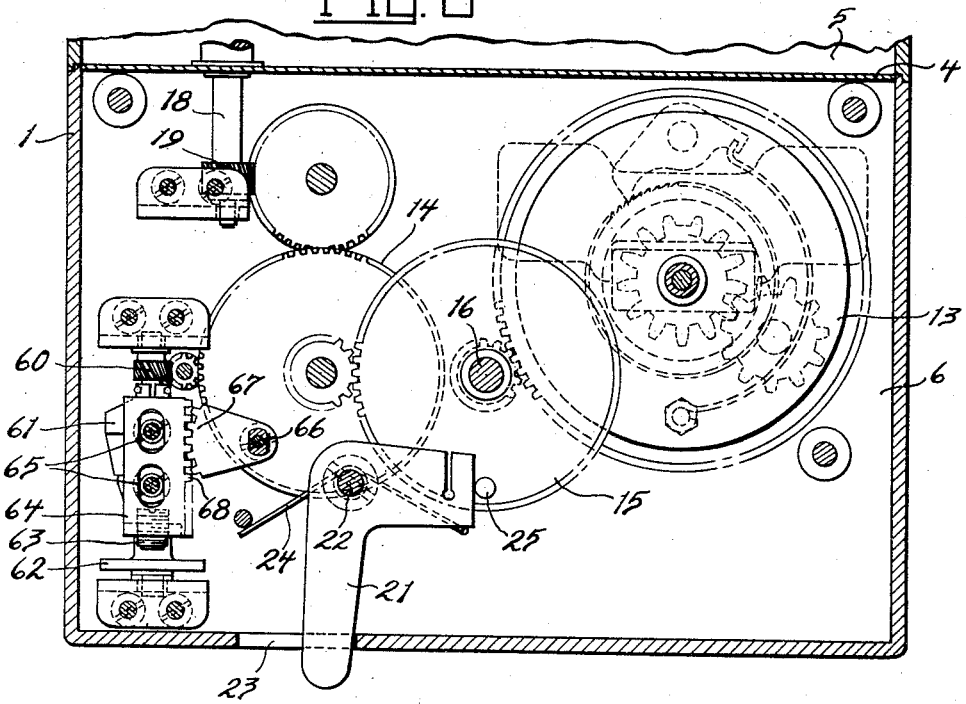
INVENTOR
BRUNO STECHBART
BY Robert F. Miehle, Jr.
ATTY.

Patented Jan. 27, 1942

2,271,235

UNITED STATES PATENT OFFICE 2,271,235

LIGHT SHUTTER MECHANISM

Bruno Stechbart, Chicago, Ill., assignor to The Bell & Howell Company, Chicago, Ill., a corporation of Illinois Application July 26, 1940, Serial No. 347,802

10 Claims. (Cl. 95—55)

My invention relates particularly to exposure shutter mechanism for photographic cameras and involving adjustment both for light opening and exposure velocity and has for its main object the provision, with a light shutter adjustable both as to light opening and exposure velocity, of a novel, effective and convenient shutter or exposure speed indicating means which instantly indicates the shutter or exposure speed comprising the light opening and exposure velocity factors of the shutter.

With this object in view, my invention consists in certain features of novelty in the construction, combination and arrangement of parts by which the said object and certain other objects, hereinafter appearing, are effected, all as fully described with reference to the accompanying drawings, and more particularly pointed out in the appended claims.

In said drawings—

Figure 6 is a sectional view substantially on the line 6—6 of Figure 3;

Figure 7 is a sectional view substantially on the line 7—7 of Figure 6; and

Figure 8 is a sectional view substantially on the line 8—8 of Figure 7.

Figure 1:
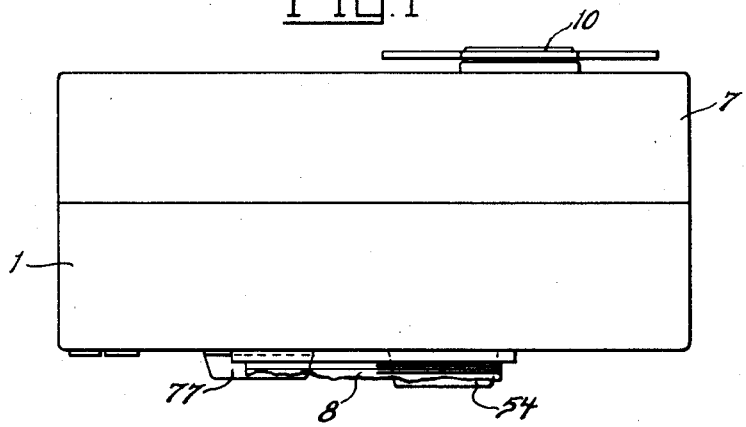
Figure 1 is a top plan view of a photographic camera embodying my invention.
Figure 2:
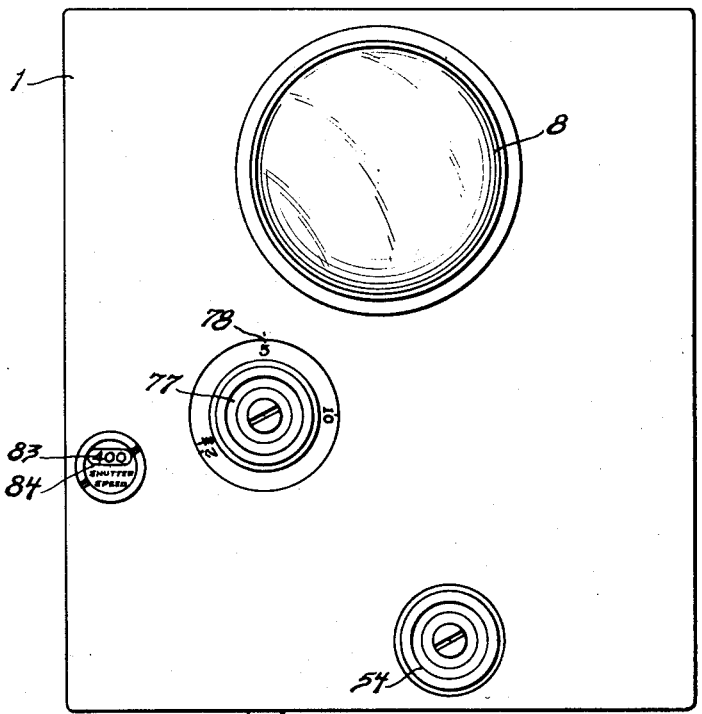
Figure 2 is a front elevation.

Referring to the drawings, a camera casing is generally designated at 1 and is provided with an intermediate transverse vertical partition 2 forming a forward chamber 3 and a rearward chamber portion which is divided horizontally by a horizontal transverse partition 4 to form an upper chamber 5 and a lower chamber 6, the upper portion of the casing being formed by a separate casing portion 7 releasably secured to the main portion of the casing in a suitable manner not shown. See Figures 1, 2, 6, 7 and 8. Mounted on the forward wall of the casing, is a suitable photographic lens 8 disposed on a forwardly and rearwardly extending axis traversing the chamber 5.

The partition 2 is provided with an exposure aperture 9 coinciding with the lens 8, and a transverse vertical film guide, generally designated at 11, is associated with the exposure aperture 9 to position a sensitized film 12 at the exposure aperture, the film being transversely movable in the exposure guide for exposing successive portions thereof. See Figures 3 and 6.

Disposed in the rear portion of the casing below the partition 4 on a forwardly extending horizontal axis, is a usual spring motor, generally designated at 13, which is wound by an exterior handle 10 at the rear of the casing. This motor drives a multiplying spur gear train generally designated at 14 and which includes an intermediate gear 15 secured on a rotatable forwardly extending shaft 16. See Figures 6, 7 and 8.

The film 12 is disposed in the rear portion of the casing above the partition 4 and, as usual, is fed from one spool, not shown, beyond one end of the guide 11, and is wound on a spool 17 beyond the other end of the guide in the movement of the film through the guide for exposing successive portions of the film. A revoluble vertical shaft 18, co-axial with the spool 17 and having a usual yieldable frictional drive connection therewith and accordingly not shown, is connected with the gear train 14 by right angle spiral gearing 19 for yieldably driving the take-up spool with actuation of the gear train 14 by the motor 13.

Releasable stop mechanism, controlling actuation of the mechanism, consists of a bell crank lever 21 pivoted at 22 and having one end thereof projecting through a slot 23 in the lower wall of the casing for finger actuation of the lever, a spring 24 urging the lever into stopping position, and a stop stud 25 mounted on the gear 15 and releasably engageable with the other arm of the lever 21 to stop rotation of the gear train 14 and the mechanism actuated thereby. See Figure 8.

Parallel guides 26 are secured in horizontal position on the upper portion of the front face of the partition 2 above and below the exposure aperture 9 and form a transversely extending slide guide. Two light shutter members 27 and 28 are slidably mounted for independent reciprocating movement transversely across the exposure opening 9 for exposing the film thereat as hereinafter described.

Two transversely spaced generally vertical arms 29 and 31 are disposed in the forward chamber 3 and have their lower portions pivoted on the partition 2 on transversely spaced forwardly extending axes, as designated at 32. See Figures 3, 6 and 7. The upper ends of the arms 29 and 31 are operatively connected, respectively, with the shutter members 27 and 28 for independently reciprocating the shutter members by means of studs 33 on the shutter members and slidably and pivotally engaged in longitudinal slots 34 of these arms.

The shaft 16 of the gear 15 is disposed adjacent the lower portions of the arms 29 and 31 and between the same and extends forwardly into the chamber 3. See particularly Figure 6.

A radial cam 35 is secured on the shaft 16 for rotation therewith immediately in front of the partition 2, and a second radial cam 36 is rotatably mounted on the shaft 16 immediately in front of the cam 35. The arms 29 and 31 are independently actuated in one direction, with resulting corresponding movement of the shutter members 27 and 28 by transversely disposed tension springs 37 secured with the intermediate portions of these arms and anchored on the partition 2.

A cam roller 38 is mounted on the arm 29 a short distance above the pivotal axis of this arm and is engaged by the cam 36 for actuation of this arm in opposition to the spring 37 of this arm, and a cam roller 39 is mounted on the arm 31 a short distance from the pivotal axis of this arm and is engaged by the cam 35 for actuation of this arm in opposition to the spring 37 of this arm.

Figure 3:
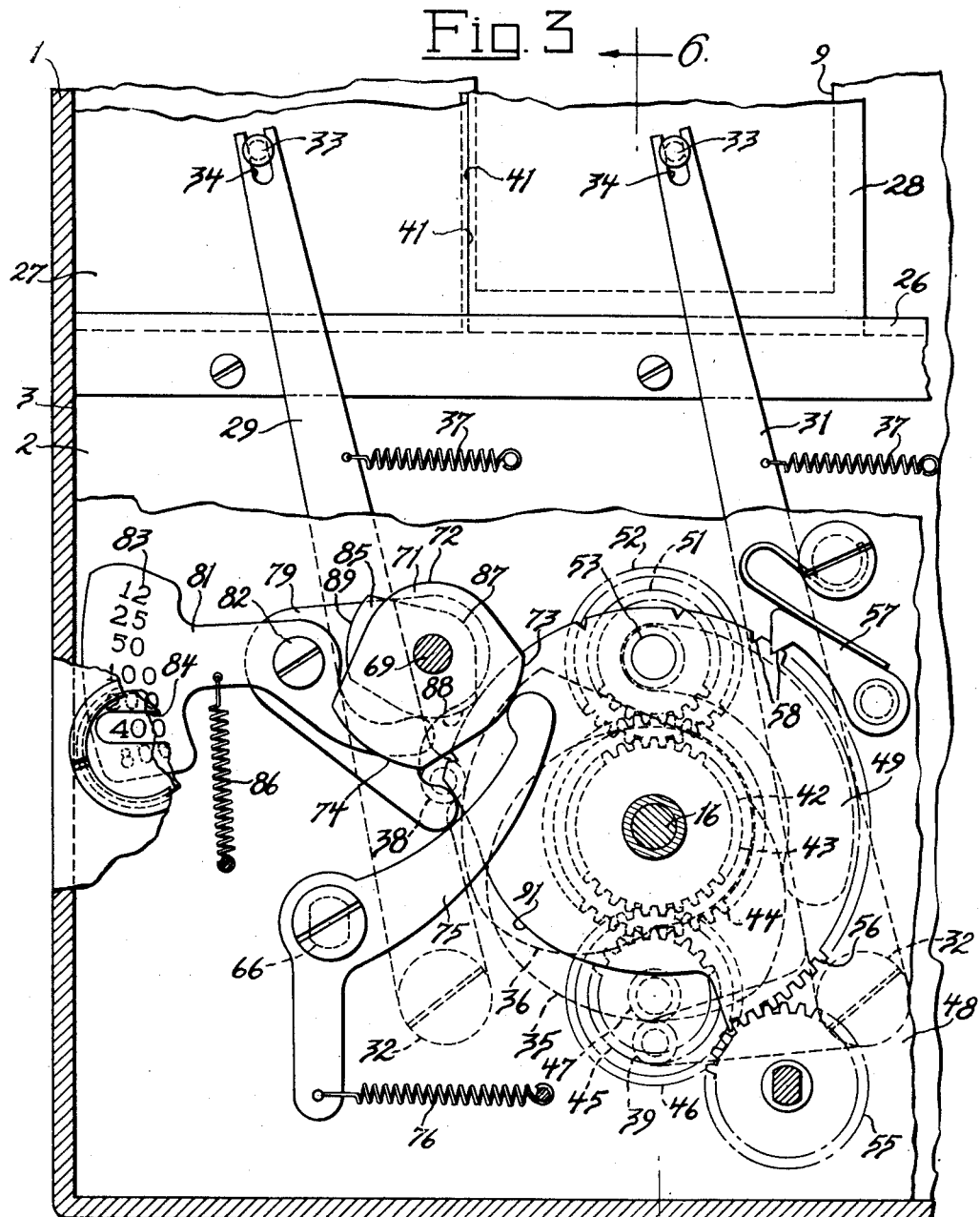
Figures 3, 4 and 5 are partial sectional views substantially on the line 3—3 of Figure 6 and showing the mechanism in different positions of adjustment.

The opposing vertical edges 41 of the shutter members 27 and 28 have abutting relation and are shouldered as shown for excluding the passage of light therebetween when in abutting relation, as shown in Figure 3, and, when the shutter members are separated in their relative reciprocable movement, the edges 41 form an exposure opening for exposing the portion of the film at the exposure aperture 9, which exposure opening is variable by relative movement of the shutter members in their reciprocable movement.

The cams 35 and 36 are driven in adjustable timed relation in the following manner, this phase of the present disclosure being the subject-matter of my co-pending U. S. application for Letters Patent, Serial Number 321,252, filed February 28, 1940, for improvement in Light shutter.

The cam 36, which is rotatable on the shaft 16, is provided with a spur gear 42, and a spur gear 43 of the same diameter as the gear 42 is secured on the shaft 16. See Figures 3 to 7 inclusive. An idler spur gear 44, of larger diameter than the gears 42 and 43, is rotatably mounted on the shaft 16, and a counter gear member, comprising a small spur gear 45 and a large spur gear 46, is rotatably mounted, as designated at 47, on a vertical transversely extending plate 48 secured with the casing in the chamber 3, and has the gear 45 meshing with the gear 44 and the gear 46 meshing with the gear 43.

A bored disk 49 is rotatably mounted on the shaft 16, and a bored counter gear member, comprising a small spur gear 51 and a large spur gear 52, is rotatably mounted, as designated at 53, on the disk 49 for angular adjustment with the disk on the axis of the shaft 16, and has the gear 51 meshing with the gear 44 and the gear 52 meshing with the gear 42.

Thus a gear train drive is provided for driving the cams 35 and 36 in timed one-to-one relation, angular adjustment of the disk 49 resulting in adjustment of the timing of the cams and consequent adjustment of the exposure or light opening formed by the shutter members 27 and 28, as fully described in my aforesaid application for U. S. Letters Patent.

The disk 49 is adjusted from the exterior of the camera by means of an angularly movable knob 54, shown in Figure 1, fixed with a gear 55, see Figure 3, which meshes with peripheral gear segment teeth 56 on the disk 49. The disk 49 is releasably retained in selected adjustments thereof by means of a spring-urged detent 57 selectively engaging in spaced notches 58 on the periphery of the disk 49. See Figures 3, 4 and 5.

In the cycle of operation of the shutter mechanism, the shutter members 27 and 28 are actuated from their starting position, as shown in Figure 3, in timed spaced relation to effect exposure and are then actuated in the opposite direction in abutting light interrupting relation to return them to their starting position, the film being actuated, by means not shown, during such return movement to position an unexposed portion thereof at the exposure aperture 9 preparatory to another exposure cycle of the shutter members.

A centrifugal speed governor of usual construction, see Figures 7 and 8, is driven from the gear train 14 by means of spiral gearing 60 and comprises rotatable centrifugal weight means 61 driven from the gear train 14, a rotatable axially movable brake disk 62 also driven from the gear train 14 and axially controlled by the weight means 61, and a non-rotatable brake element 63 frictionally engageable with the brake disk in opposition to axial actuation of the brake disk by the weight means and mounted on a carrier member 64 slidably mounted, as designated at 65, to adjustably position the brake element 63 axially of the brake disk 62 for adjusting the governor controlled speed of the mechanism and consequently adjustably varying the exposure velocity of the shutter members 27 and 28. A rotatable shaft 66, disposed on a horizontal forwardly extending axis, is provided with a gear segment 67 which meshes with a rack 68 on the carrier member 64 for adjusting the carrier member.

A rotatable shaft 69, disposed on a horizontal forwardly extending axis, has fixed therewith a radial cam 71 provided with three angularly spaced dwell portions 72, 73 and 74 of different radii, and an arm 75 is secured on the shaft 66 and is maintained in engagement with the cam 71 by a spring 76, so that the cam 71 is operative, through the arm 75, the shaft 66, and the gear segment 67 meshing with the rack 68, to adjust the carrier member 64 and brake element 63 for adjusting the speed of the mechanism and consequently the exposure velocity of the light shutter, each of the dwell portions 72, 73 and 74 representing a predetermined exposure velocity. See Figures 3, 4, 5, 6 and 7. The shaft 69 is adjusted from the exterior of the camera by a rotatable knob 77 secured on this shaft, suitable scale and index means, generally designated at 78, being associated with this knob for indicating the shutter exposure velocity.

An arm or actuating member 79 is pivotally mounted on the shaft 69 for pivotal movement on the axis thereof, and an indicating arm 81 has the intermediate portion thereof pivotally mounted on the arm 79 on an axis parallel to the pivotal axis of the arm 79 and of the shaft 69, as designated at 82. One end of the arm 81 is provided with an angularly extending shutter or exposure speed indicating scale 83, which lies on the inside of and traverses, in the movement of this arm, a restricted window 84 in the front wall of the casing to be visible at the window, the restricted window forming an index for the scale to indicate the shutter or exposure speed.

The other end of the arm 81 is maintained in engagement with a radial cam 85, secured on the shaft 69, by means of a spring 86, so that angular movement of the shaft 69 effects pivotal movement of the arm 81 on its mounting 82, thus varying the shutter speed indication at the window 84. The cam 85, which is fixed with the cam 71, is provided with three angularly spaced dwell portions 87, 88 and 89 of different radii corresponding respectively with the dwells 72, 73 and 74 of the cam 71, so that as the cam 71 is positioned to engage one of its dwells with the arm 75, thus effecting the corresponding shutter velocity adjustment, the corresponding dwell of the cam 85 engages the arm 81 to position it for indication with reference to the instant exposure velocity of the shutter.

The periphery of the shutter opening adjusting disk 49 is provided with a radial cam 91 which is engaged by the arm 79 for pivotally adjusting this arm in correspondence with the light opening of the shutter, the spring 86 serving to maintain the arm 79 in engagement with the cam 91. Adjustment of the arm 79 on its pivotal axis effects corresponding adjustment of the pivotal mounting 82 of the arm 81, so that the arm 81 is thus adjusted for indication with reference to the instant light opening of the shutter.

Th cam 85 operating on the arm 81, and the cam 91 operative on the pivoted arm 79 operating in conjunction with the pivotal mounting 82 of the arm 81 on the arm 79, operate in parallel mutually reactive relation for positioning the arm 81 in accordance with both the instant light opening of the shutter and with the instant exposure velocity of the shutter, thus conveniently indicating the shutter or exposure speed involving both of these factors.

Figure 4:
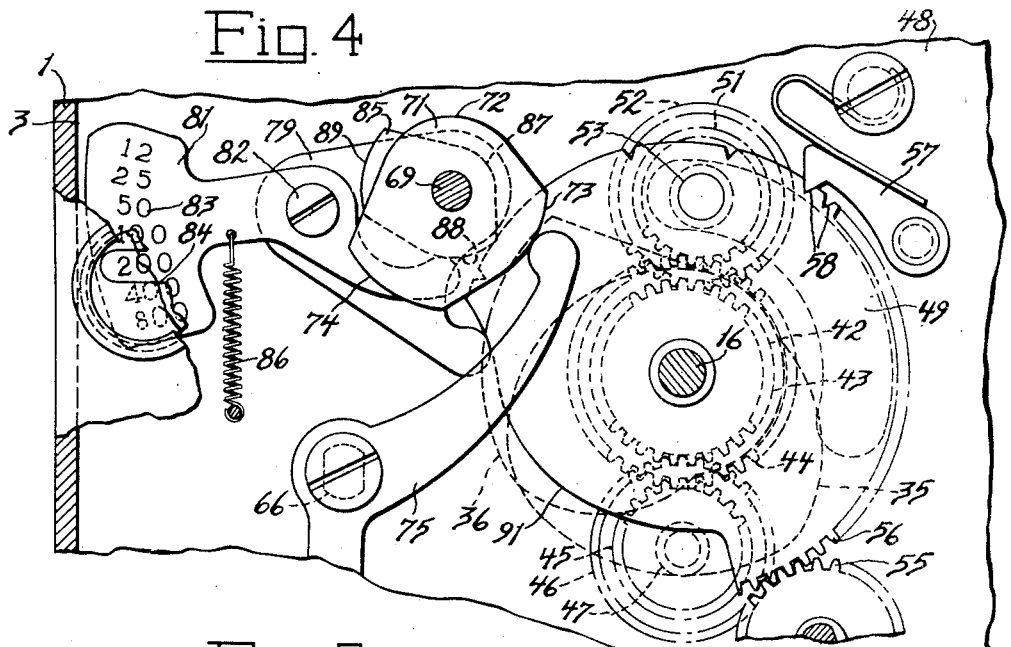
Figure 5:
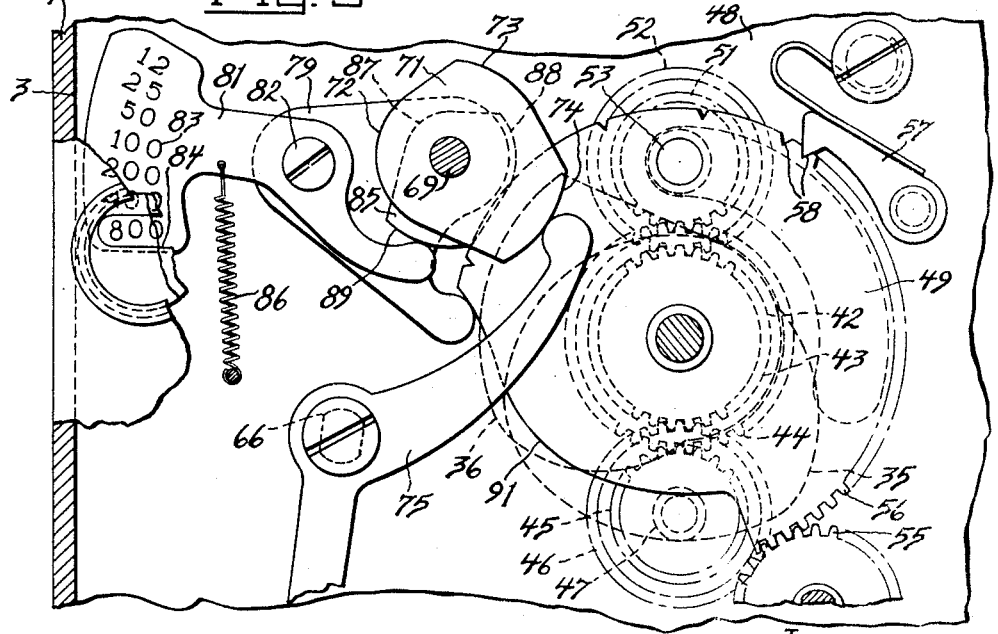

Figures 3, 4 and 5 show the mechanism in different adjustments thereof, the arm 81 being engaged with the intermediate dwell 88 of the shutter velocity indicating cam 85 in Figures 3 and 4 and with the highest dwell 89 of the cam 85 in Figure 5, and the arm 79 being positioned in the same position by the shutter opening indicating cam 91 in Figures 3 and 5 and in another position in Figure 4, resulting in correspondingly different shutter or exposure speed indications by the scale 83 of the arm 81. In the construction shown, adjustment of the shutter light opening which adjusts the arm 79 on the pivotal axis of the cam 85 does not cause pivotal movement of the arm 81 on its pivotal axis 82, the arm 81 merely moving along the engaged dwell 87, 88 or 89 of the cam 85.

While I have thus described my invention, I do not wish to be limited to the precise details described, as changes may be readily made without departing from the spirit of my invention, but having thus described my invention, I claim as new and desire to secure by Letters Patent the following.

I claim:

1. In a light shutter mechanism, the combination with a light shutter, of adjustable means for varying the light opening of said shutter, adjustable means for varying the exposure velocity of said shutter, a movable shutter speed indicating member, and two means respectively under the control of said light opening and exposure velocity varying means and operatively connected with said indicating member in parallel mutually reactive relation for positioning said indicating member to indicate the instant shutter speed.

2. In a light shutter mechanism, the combination with a light shutter, of adjustable means for varying the light opening of said shutter, adjustable means for varying the exposure velocity of said shutter, a movable shutter speed indicating member, and two means respectively under the control of said light opening and exposure velocity varying means and including a pivotal connection with said indicating member and operatively connected with said indicating member in parallel mutually reactive relation for positioning said indicating member to indicate the instant shutter speed.

3. In a light shutter mechanism, the combination with a light shutter, of adjustable means for varying the light opening of said shutter, adjustable means for varying the exposure velocity of said shutter, a movable shutter speed indicating member, and means under the control of said light opening and exposure velocity varying means and operative on said indicating member to indicate the instant shutter sped comprising movably mounted actuating means under the control of one of said adjustable means, an operative connection between said indicating member and said actuating means permitting independent movement of said indicating member with reference to said actuating means, and a second actuating means under the control of the other of said adjustable means and operative on said indicating member with reference to said independent movement thereof.

4. In a light shutter mechanism, the combination with a light shutter, of adjustable means for varying the light opening of said shutter, adjustable means for varying the exposure velocity of said shutter, a movable shutter speed indicating member, and means under the control of said light opening and exposure velocity varying means and operative on said indicating member to indicate the instant shutter speed comprising a pivotally mounted actuating member under the control of one of said adjustable means, a pivotal mounting carrying said indicating member on said actuating member for pivotal movement with reference thereto on an axis parallel to the pivotal axis of said actuating member, and additional actuating means under the control of the other of said adjustable means and operative to actuate said indicating member on its pivotal mounting.

5. In a light shutter mechanism, the combination with a light shutter, of adjustable means for varying the light opening of said shutter, adjustable means for varying the exposure velocity of said shutter, a movable shutter speed indicating member, and means under the control of said light opening and exposure velocity varying means and operative on said indicating member to indicate the instant shutter speed comprising a pivotally mounted actuating member under the control of one of said adjustable means, a pivotal mounting carrying said indicating member on said actuating member for pivotal movement with reference thereto on an axis parallel to the pivotal axis of said actuating member, and an angularly movable radial cam under the control of the other of said adjustable means and disposed on the pivotal axis of said actuating member and operative on said indicating member.

6. In a light shutter mechanism, the combination with a light shutter, of adjustable means for varying the light opening of said shutter, adjustable means for varying the exposure velocity of said shutter, a movable shutter speed indicating member, and means under the control of said light opening and exposure velocity varying means and operative on said indicating member to indicate the instant shutter speed comprising a pivotally mounted actuating member, a pivotal mounting carrying said indicating member on said actuating member for pivotal movement with reference thereto on an axis parallel to the pivotal axis of said actuating member, an angularly movable radial cam under the control of one of said adjustable means and disposed on an axis parallel to the pivotal axis of said actuating member and operative thereon, and a second angularly movable radial cam under the control of the other of said adjustable means and disposed on the pivotal axis of said actuating member and operative on said indicating member.

7. In a light shutter mechanism, the combination with a light shutter, of adjustable means for varying the light opening of said shutter, adjustable means for varying the exposure velocity of said shutter, one of said adjustable means including an angularly movable adjusting member, a movable shutter speed indicating member, and means under the control of said light opening and exposure velocity varying means and operative on said indicating member to indicate the instant shutter speed comprising an actuating member pivotally mounted on the axis of said adjusting member and under the control of the other of said adjustable means, a pivotal mounting carrying said indicating member on said actuating member for pivotal movement with reference thereto on an axis parallel to the pivotal axis of said actuating member, and additional actuating means under the control of said adjusting member and operative to actuate said indicating member on its pivotal mounting.

8. In a light shutter mechanism, the combination with a light shutter, of adjustable means for varying the light opening of said shutter including an angularly movable adjusting member, adjustable means for varying the exposure velocity of said shutter including a second angularly movable adjusting member disposed on an axis parallel to that of said first mentioned adjusting member, a movable shutter speed indicating member, and means under the control of said light opening and exposure velocity varying means and operative on said indicating member to indicate the instant shutter speed comprising an actuating member pivotally mounted on the axis of one of said adjusting members, a radial cam on the other of said adjusting members for actuating said actuating member, a pivotal mounting carrying said indicating member on said actuating member for pivotal movement with reference thereto on an axis parallel to the pivotal axis of said actuating member, and a second radial cam on said one adjusting member and operative on said indicating member to actuate the same on its pivotal mounting.

9. In a light shutter mechanism, the combination with a light shutter, of adjustable means for varying the light opening of said shutter, adjustable means for varying the exposure velocity of said shutter, a movable shutter indicating member, and means under the control of said light opening and exposure velocity varying means and operative on said indicating member to indicate the instant shutter speed comprising a pivotally mounted actuating member under the control of one of said adjusting means, a pivotal mounting carrying said indicating member on said actuating member for pivotal movement with reference thereto on an axis parallel to the pivotal axis of said actuating member, and an angularly movable radial cam co-axial with the pivotal axis of said actuating member and under the control of the other of said adjustable means and operative on said indicating member and provided with a plurality of angularly spaced dwell portions of different radii.

10. In a light shutter mechanism, the combination with a light shutter, of adjustable means for varying the light opening of said shutter, adjustable means for varying the exposure velocity of said shutter, a movable shutter indicating member, and means under the control of said light opening and exposure velocity means and operative on said indicating member to indicate the instant shutter speed comprising a pivotally mounted actuating member, a pivotal mounting carrying said indicating member on said actuating member for pivotal movement with reference thereto on an axis parallel to the pivotal axis of said actuating member, an angularly movable radial cam co-axial with the pivotal axis of said actuating member and under the control of said exposure velocity means and operative on said indicating member and provided with a plurality of angularly spaced dwell portions of different radii, and a second angularly movable radial cam disposed on an axis parallel to that of said first mentioned cam and under the control of said light opening varying means and operative on said actuating member.

BRUNO STECHBART.